US012538163B2

(12) United States Patent
Rahman (10) Patent No.: US 12,538,163 B2
(45) Date of Patent: Jan. 27, 2026

(54) SERVICE-BASED SELECTION OF A TDD PATTERN FOR A UE

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 441 days.

(21) Appl. No.: 18/055,243

(22) Filed: Nov. 14, 2022

(65) Prior Publication Data

US 2024/0163712 A1 May 16, 2024

(51) Int. Cl.
*H04W 28/02* (2009.01)
*H04L 5/14* (2006.01)
*H04W 72/0446* (2023.01)
*H04W 72/543* (2023.01)

(52) U.S. Cl.
CPC ....... *H04W 28/0268* (2013.01); *H04L 5/1469* (2013.01); *H04W 28/0273* (2013.01)

(58) Field of Classification Search
CPC .......... H04W 28/0268; H04W 28/0273; H04L 5/1469
See application file for complete search history.

(56) References Cited

U.S. PATENT DOCUMENTS

| | | | | |
|---|---|---|---|---|
| 2007/0171850 A1* | 7/2007 | Feder | ................... | H04W 68/00 370/335 |
| 2019/0342541 A1* | 11/2019 | Bai | ......................... | H04W 4/06 |
| 2023/0275739 A1* | 8/2023 | Guduru | ................ | H04L 1/0026 370/329 |
| 2023/0327844 A1* | 10/2023 | Liu | ..................... | H04W 72/542 370/329 |
| 2023/0361979 A1* | 11/2023 | Simonsson | ........... | H04W 16/04 |
| 2024/0259120 A1* | 8/2024 | Ansari | ............. | H04W 72/0446 |

OTHER PUBLICATIONS

Esswie, et al., "Analysis of Outage Latency and Throughout Performance in Industrial Factory 5G TDD Deployments", IEEE 93rd Vehicular Technology Conference, Apr. 25, 2021, pp. 1-6.
Search Report for European Application No. 23207514.3, Dated Apr. 25, 2024, 9 pages.

\* cited by examiner

*Primary Examiner* — Xuan Lu
(74) *Attorney, Agent, or Firm* — Lee & Hayes, P.C.

(57) ABSTRACT

A base station configured to select a time division duplex (TDD) pattern for a user equipment (UE) is described herein. The base station determines a QoS parameter associated with a traffic flow for a UE, selects a TDD pattern for the UE based on the QoS parameter, and configures the UE with the TDD pattern. The base station may select different TDD patterns for the UE based on different QoS parameters associated with different traffic flows of the UE.

20 Claims, 4 Drawing Sheets

SERVICE-BASED SELECTION OF A TDD PATTERN FOR A UE

BACKGROUND

The Third Generation Partnership Project (3GPP) specifies seven different Time Division Duplex (TDD) patterns of uplink and downlink transmissions in seven different ratios of downlink to uplink. For example, one TDD pattern could have a downlink to uplink ratio of 70:30, another could have a ratio of 50:50, and another could have a ratio of 20:80. Employing a TDD pattern is necessary as the downlink and uplink share the same spectrum in TDD, using it at different times. Currently, each mobile network operator uses a single TDD pattern for its entire network, which may result in good use of the spectrum for some services and poor use of the spectrum for other services. For example, a mobile network operator might use a 50:50 ratio and corresponding TDD pattern for its mobile network. While such a TDD pattern might work well for voice calling or video calling, where the amounts of data sent from and received by a user equipment (UE) are similar, it might work less well for video streaming or data downloads, where more data is sent to the UE then received from it.

From the perspective of a base station sending data to a UE or receiving data from it, the traffic is not differentiated by service. The base station does not know whether the downlink data it is sending to a UE is associated with a voice call or a data download without taking additional steps like packet inspection that may degrade the service provided to the UE.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes a base station configured to select a TDD pattern for a UE. The base station determines a quality-of-service (QoS) parameter associated with a traffic flow for a UE, selects a TDD pattern for the UE based on the QoS parameter, and configures the UE with the TDD pattern. The base station may select different TDD patterns for the UE based on different QoS parameters associated with different traffic flows of the UE.

In various implementations, the QoS parameter is one of an allocation and retention priority (ARP), a QoS class identifier (QCI), or a Fifth Generation (5G) QoS identifier (5QI). The traffic flow that the QoS parameter is associated with may in turn be associated with a service, with different services having different QoS parameters. In such implementations, the QoS parameters may serve as proxies for service identifiers. Examples of services may include any of a voice calling service, a video calling service, a messaging service, a video streaming service, a data browsing service, a video conferencing service, a security camera service, or an augmented reality/virtual reality (AR/VR) service.

In some implementations, the TDD pattern selected for a QoS parameter associated with a data browsing service or a video streaming service utilizes a downlink-weighted TDD ratio. The TDD pattern selected for a QoS parameter associated with a voice calling service, a video calling service, a messaging service or a video conferencing service may utilize a TDD ratio equally weighted between downlink and uplink. The TDD pattern selected for a QoS parameter associated with a security camera service may utilize an uplink-weighted TDD ratio.

In further implementations, a base station may concurrently engage in two traffic flows with a UE. Those two traffic flows may be associated with different services and different QoS parameters. In selecting a TDD pattern based on different QoS parameters, the base station may rely on its configuration, which may prioritize between the different QoS parameters and select the TDD pattern based on the higher priority QoS parameter.

Additionally, the base station may be configured to determine an association between a QoS parameter and a TDD pattern by observing traffic patterns associated with the QoS parameter. The base station may then associate the TDD pattern that best matches the traffic patterns with the QoS parameter for the service having those traffic patterns.

Example Environment

Figure 1:
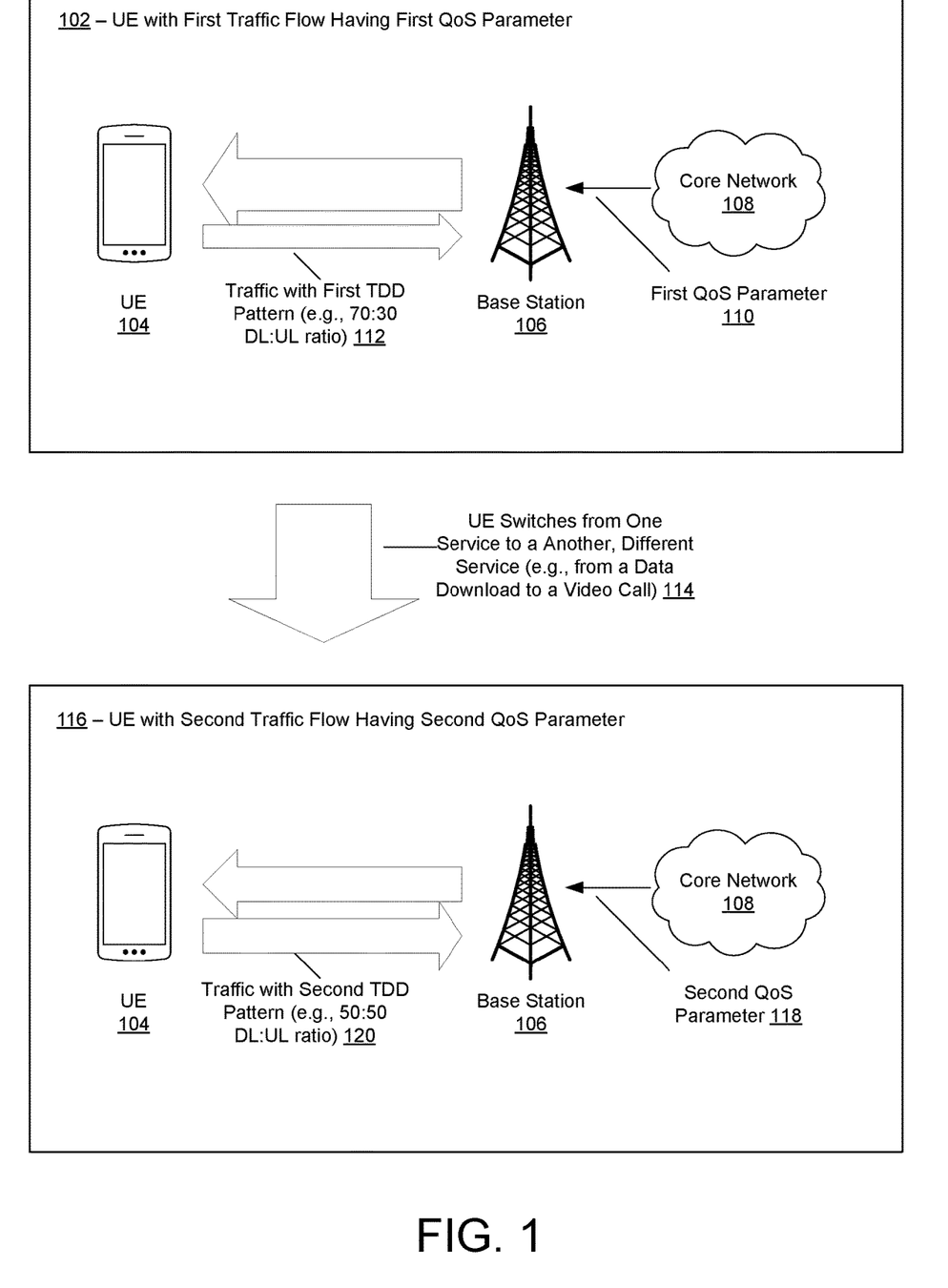
FIG. 1 shows an example of a network environment in which a base station selects different TDD patterns for a UE based on quality-of-service (QoS) parameters of different traffic flows for the UE.

FIG. 1 shows an example of a network environment in which a base station selects different TDD patterns for a UE based on quality-of-service (QoS) parameters of different traffic flows for the UE. As illustrated, view 102 shows use of a first QoS parameter for a first traffic flow of a UE 104. The UE 104 may be connected to the base station 106 for transmission of the first traffic flow, which may be related to a service engaged in/consumed by the UE 104. The base station 106, while establishing a session related to the first traffic flow, receives from the core network 108 a message 110 containing the first QoS parameter. Based on the first QoS parameter, the base station 106 selects a first TDD pattern for communications with the UE 104 and configures the UE 104 with the first TDD pattern. Traffic 112 between the UE 104 and base station 106 is exchanged in accordance with the first TDD pattern. Subsequently at 114, the UE 104 may change to a different service with a different, second traffic flow and different, second QoS parameter. View 116 shows use of the second QoS parameter for the second traffic flow. As shown, the base station 106, while establishing a session related to the second traffic flow, receives from the core network 108 a message 118 containing the second QoS parameter. Based on the second QoS parameter, the base station 106 selects a second TDD pattern for communications with the UE 104 and configures the UE 104 with the second TDD pattern. Traffic 120 between the UE 104 and base station 106 is exchanged in accordance with the second TDD pattern.

In various implementations, the UE 104 can be any device that can wirelessly connect to the base station 106. In some examples, the UE 104 can be a mobile phone, such as a smart phone or other cellular phone. In other examples, the UE 104 can be a personal digital assistant (PDA), a media player, a tablet computer, a gaming device, a smart watch, a hotspot, an Internet of Things (IoT) device, a wearable device, an augmented reality/virtual reality (AR/VR) device, a personal computer (PC) such as a laptop, desktop, or workstation, or any other type of computing or communication device. The UE 104 may be configured with a platform and applications enabling the UE 104 to engage in any of a number of services, such as a voice calling service, a video calling service, a messaging service, a video streaming service, a data browsing service, a video conferencing service, a security camera service, or an AR/VR service. The UE 104 may also include a transmission interface, including at least a radio and supporting software, for transmitting and receiving communications with the base station 106 on at least a TDD band (e.g., the n41 band) using TDD.

In some implementations, the base station 106 can be part of an access network of a telecommunication network, such as a radio access network (RAN). The telecommunication network can also have the core network 108 linked to the access network. The UE 104 can wirelessly connect to the base station 106 of the access network, and in turn be connected to the core network 108 via the base station 106. The core network 108 can also link the UE 104 to an Internet Protocol (IP) Multimedia Subsystem (IMS), the Internet, and/or other networks.

The UE 104 and elements of the telecommunication network, such as the base station 106, other elements of the access network, and/or the core network 108, can be compatible with one or more radio access technologies, wireless access technologies, protocols, and/or standards. For example, the UE 104, the base station 106, and/or the core network 108 can support fifth generation (5G) new radio (NR) technology, Long-Term Evolution (LTE)/LTE Advanced technology, High-Speed Data Packet Access (HSDPA)/Evolved High-Speed Packet Access (HSPA+) technology, other fourth generation (4G) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

As an example, the base station 106 can be a gNodeB (gNB) of a 5G access network. As another example, the access network can be an LTE access network, known as an Evolved UMTS Terrestrial Radio Access Network (E-UTRAN), and the base station 106 can be an evolved Node B (eNB) of the LTE access network. The core network 108 can also be based on LTE or 5G. For instance, the core network 108 can be a 5G core network or an LTE packet core network known as an Evolved Packet Core (EPC). The base station 106 and the core network 108 may be based on the same radio access technology, or different radio access technologies. For instance, in some examples the base station 106 can be a 5G gNB that is linked to an LTE core network and/or a 5G core network.

Figure 3:
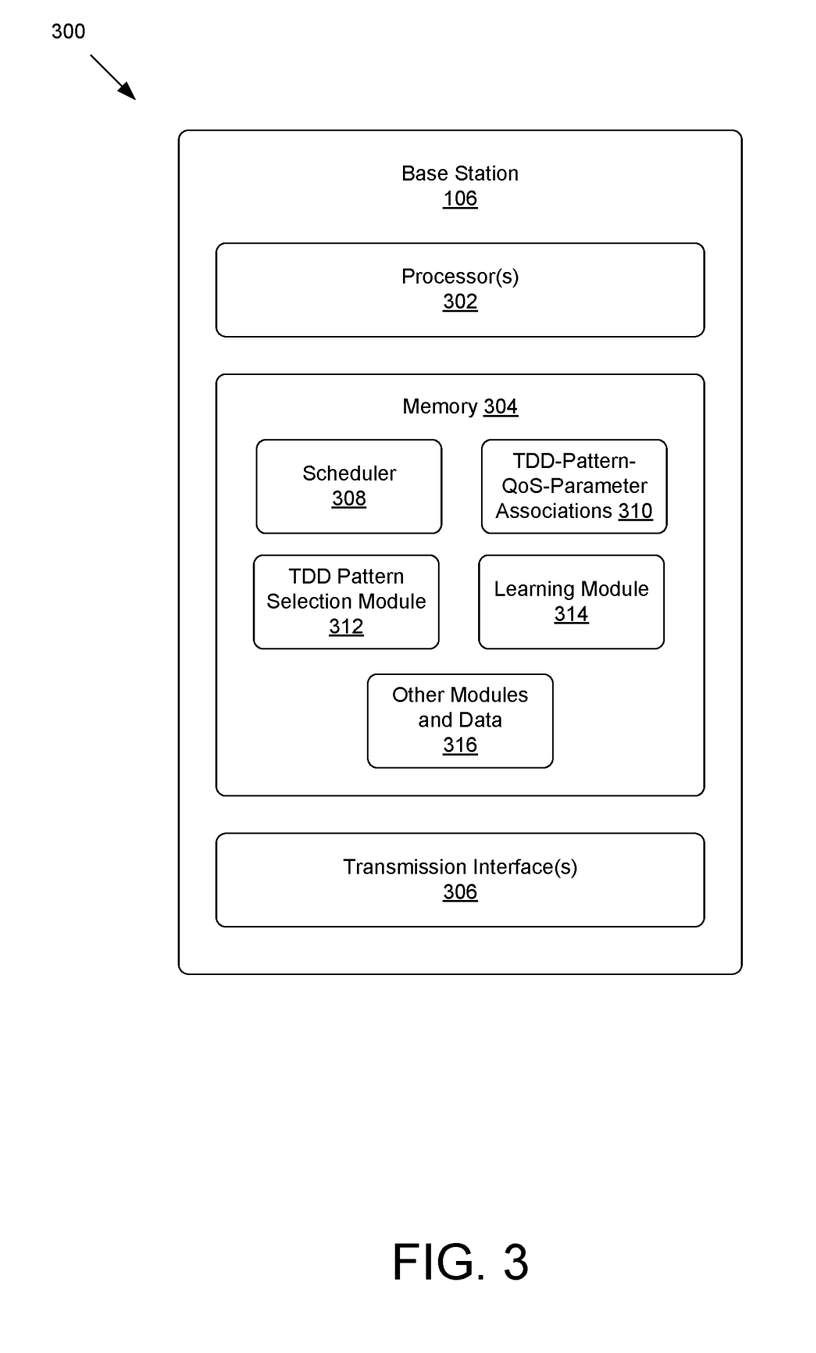
FIG. 3 shows an example of a system architecture for the base station.

The base station 106 also includes on or more radio antennas, a transmission interface, a scheduler, QoS-parameter-TDD-pattern associations, and a TDD pattern selection module. The base station 106 may also include a learning module to observe and add to QoS-parameter-TDD-pattern associations, as well as any other logic or components that base stations may be equipped/configured with. An example of a base station 106 is illustrated in FIG. 3 and described herein with reference to that figure.

As noted, the core network 108 may be an EPC and can include nodes such as a Home Subscriber Server (HSS), Mobility Management Entity (MME), and Policy and Charging Rules Function (PCRF). Alternatively, the core network may be a 5G core network can includes nodes such as a Unified Data Management (UDM) node, an Access and Mobility Management Function (AMF), and a Policy Control Function (PCF). The core network 108 can include an IMS or be connected to one and further includes gateway devices for access to external networks, such as the Internet, and external services.

In various implementations, a UE 104 first connects to the base station 106 on the radio layer and lower layers, using, for example, messages of the radio resource control (RRC) protocol establish a connection. Once connected, the UE 104 may send messages through the base station 106 to one or more nodes of the core network 108, such as IMS nodes, to establish a communication session that may support one or more services. Such messages to the IMS may be, for example, Session Initiation Protocol (SIP) messages. As part of establishing a session for a service consumed/engaged in by the UE 104, the base station 106 may receive message(s) from node(s) of the core network 108, such as a message 110 from a PCRF/PCF. Such a message 110 may specify a QoS parameter, such as the first QoS parameter, associated with the UE 104 or its subscriber and with the service engaged in/consumed by the UE 104. In some implementations, the QoS parameter may include a number of value/priorities. Example QoS parameters may include any of an ARP, a QCI, or a 5QI. QoS parameter may serve as a proxy for an identifier of the service consumed/engaged in by the UE 104 since no such service identifier is directly available to the base station 106.

Upon receiving and determining the first QoS parameter, the base station 106 may consult QoS-parameter-TDD-pattern associations (which may be stored locally or accessed from a remote location) to select a first TDD pattern associated with the first QoS parameter. Such selection may be performed by a TDD pattern selection module of the base station 106, which may be a ruleset that is configurable to handle both simple selection and prioritization (when more complex selection is involved). For example, if the UE 104 is engaged in two services associated with different QoS parameters, the ruleset may specify which of the QoS parameters is prioritized for TDD pattern selection. With video calling and data downloads, for instance, different QoS parameters likely apply. If the services are engaged in concurrently by the UE 104, two different TDD patterns may apply. If only one is to be used, however, the base station 106 must prioritize. Once the first TDD pattern is selected, the base station 106 may configure the UE 104 with the selected first TDD pattern. Such configuration may simply be informing the UE 104 of the selected first TDD pattern and relying on knowledge of the first TDD pattern by the UE 104, or it may include sending instructions that specify details of the first TDD pattern.

In various implementations, the first TDD pattern is one of seven TDD patterns defined by the 3GPP, each pattern having a different proportion of downlink and uplink. Since the same spectrum is used for both downlink and uplink, it is divided into slots allocated at different times in different amounts such that, for some unit of time and range of spectrum, a ratio obtains. Such a ratio could be 70:30 between downlink and uplink, or 50:50, or 20:80. The TDD pattern selected for a QoS parameter may be a function of the expected traffic volumes for the traffic flow associated with the QoS parameter. For example, in a traffic flow for data download, more downlink traffic may be expected than uplink traffic, and so the TDD pattern that most closely fits such traffic may be the TDD pattern with the 70:30 TDD ratio.

An example of a TDD pattern, as specified by the 3GPP, is as follows:

TDD Slot format table from TS (3GPP 38.213 Table 11.1.1-1)

| Format | \multicolumn{14}{c}{Symbol Number in a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 62-254 | \multicolumn{14}{c}{Reserved} | | | | | | | | | | | | | |
| 255 | \multicolumn{14}{c}{UE determines the slot format for the slot based on tdd-UL-DL-Configuration Common, or TDD-ULDL-} | | | | | | | | | | | | | |

D: Downlink,
U: Uplink,
F: Flexible

The associations of QoS parameters and TDD patterns may all be defined by a network operator and stored in advance on the base station 106. Alternatively or additionally, the base station 106 may have a learning module that observes ratios of downlink traffic to uplink traffic for each QoS parameter, finds a closest match among the seven TDD patterns, and updated the associations stored on the base station 106 based on the observed/learned associations.

With the UE 104 configured according to the first TDD pattern, traffic 112—uplink and downlink transmissions— are exchanged between the UE 104 and base station 106 using the first traffic flow in accordance with the first TDD pattern.

In some implementations, at 114, the UE 104 may subsequently switch to a different service. The new service may be associated with a second traffic flow and have a second QoS parameter, as shown in view 116. As part of the control messaging establishing the session for the new service, the base station 106 receives the second QoS parameter in a message 118 from the PCRF/PCF. The second QoS parameter may be the same type of QoS parameter as the first QoS parameter (ARP, QCI, 5QI) of a different type. The base station 106 then selects a second TDD pattern, which is different from the first TDD pattern, in the manner described above for the first TDD pattern and configures the UE 104 with the second TDD pattern. For example, if the service associated with the first traffic flow was data download, and the first TDD pattern had a 70:30 ratio, the new service associated with the second traffic flow may be a video calling service and the second TDD pattern may have a 50:50 ratio. Traffic 120 is then exchanged between the UE 104 and base station 106 in accordance with the second TDD pattern.

Example Messages

Figure 2:
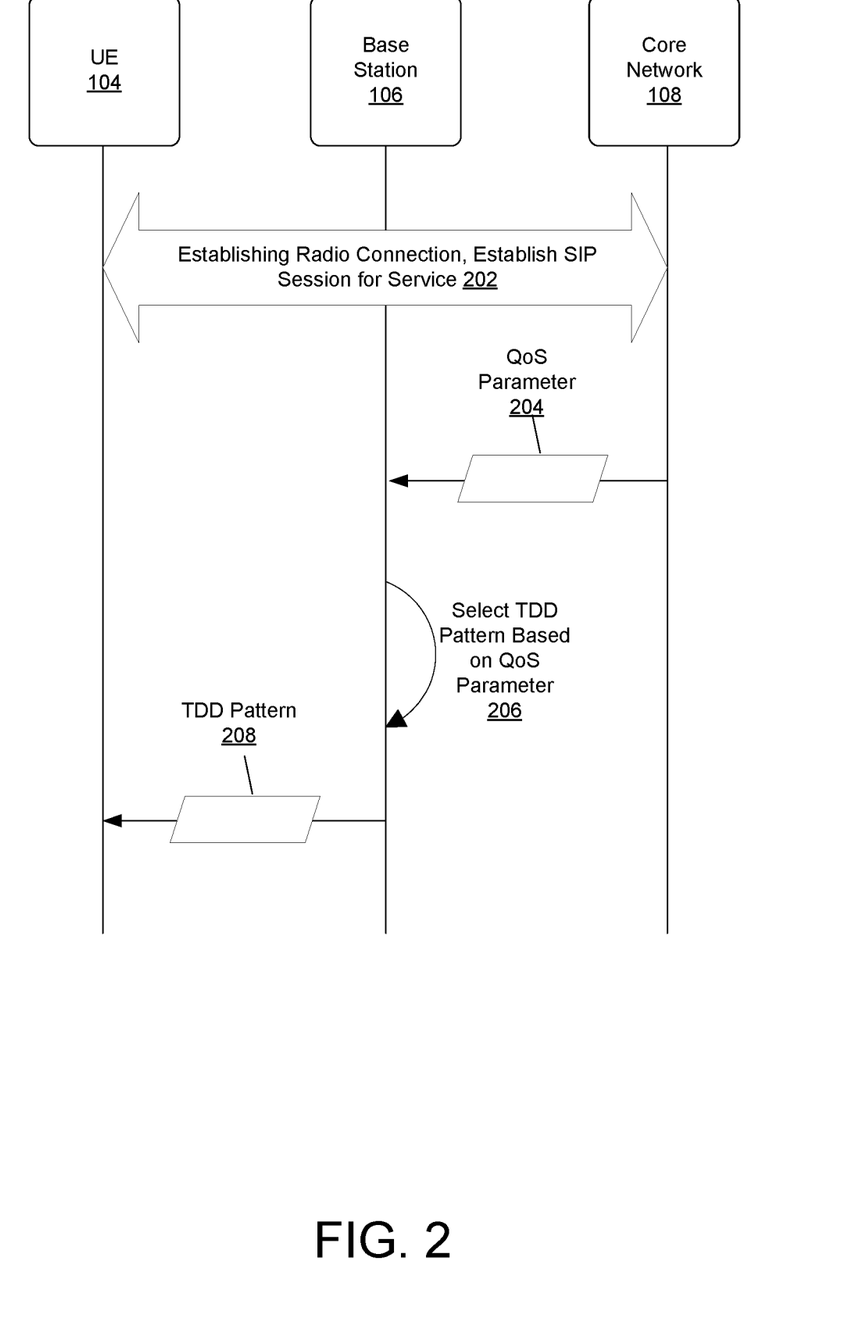
FIG. 2 shows a sequence diagram of a general example sequence of messages corresponding to selection of a TDD pattern for a UE based on a QoS parameter received from a core network node for the UE and configuration of the UE with the TDD pattern.

FIG. 2 shows a sequence diagram of a general example sequence of messages corresponding to selection of a TDD pattern for a UE based on a QoS parameter received from a core network node for the UE and configuration of the UE with the TDD pattern. As shown in FIG. 2, the UE 104, base station 106, and core network 108 may exchange messages to establish a radio network connection between the UE 104 and base station 106 and an application layer connection between the UE 104 and core network 108, through the base station 106. These messages and connections are shown in arrow 202, which gives, as examples, RRC communications for establishing a radio link and SIP communications for establishing a SIP session.

As part of the communications with the core network 108 shown at 202, the base station receives a message 204 from the core network 108, such as a message 204 that includes a QoS parameter associated with a traffic flow or service engaged in by the UE 104. The QoS Parameter may be a block of values or a single value and may be interpreted, at 206, by the base station 106 as indicating a specific TDD pattern. As described herein, the base station 106 determines the QoS parameter from the message 204, selects, at 206, a TDD pattern and, at 208 configures the UE 104 with the TDD pattern. Such configuring at 208 may be control plane messaging indicating a single value representing the TDD pattern or may be instructions specifying the TDD pattern itself.

As also shown and described, the UE 104 may change services from time to time, which may in turn trigger the sending of a new message 204 with an updated QoS parameter, which may be different from the previous QoS parameter. Upon receiving the new message 204, the base station 106 may first determine if the QoS parameter has changed. If it has no, the base station 106 may continue to use the same TDD pattern. If it has changed, the base station 106 may then determine if the updated QoS parameter is associated with a different TDD pattern than the one in use/most recently used one. If the updated QoS parameter is associated with the same TDD pattern, the base station 106 may continue to use that same TDD pattern. On the other hand, if the updated QoS parameter is associated with a different TDD pattern, the base station 106 select, at 206, the different TDD pattern and configures the UE 104, at 208, with the different TDD pattern.

Example Architecture

FIG. 3 shows an example 300 of a system architecture for the base station 106, in accordance with various examples. The base station 106 can be a 5G gNB, an LTE eNB, or other type of base station as described above. As shown, the base station 106 can include processor(s) 302, memory 304, and transmission interfaces 306.

The processor(s) 302 may be a central processing unit (CPU), or any other type of processing unit. Each of the one or more processor(s) 302 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 302 may also be responsible for executing all computer-executable instructions and/or computer applications stored in the memory 304.

In various examples, the memory 304 can include system memory, which may be volatile (such as RAM), non-volatile (such as ROM, flash memory, etc.) or some combination of the two. The memory 304 can also include additional data storage devices (removable and/or non-removable) such as, for example, magnetic disks, optical disks, or tape. Memory 304 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other non-transitory medium which can be used to store the desired information and which can be accessed by the base station 106. Any such non-transitory computer-readable media may be part of the base station 106.

The memory 304 can store computer-readable instructions and/or other data associated with operations of the base station 106. For example, the memory 304 can store computer-readable instructions and/or other data associated with a scheduler 308, QoS-parameter-TDD-pattern associations 310, a TDD pattern selection module 312, and a learning module 314. The scheduler may allocate frequency resources, from, e.g., a TDD band, to a UE, such as UE 104, in accordance with a TDD pattern. The QoS-parameter-TDD-pattern associations 310 may inform the TDD pattern selection module 312 in its selection of a TDD pattern for a UE based on a QoS parameter received, e.g., from a core network node, such as a PCF/PCRF. As described herein the QoS parameter is associated with a traffic flow of a service engaged in by the UE, the service and its traffic flow being transmitted by the allocated frequency resources. The learning module 314 may observe traffic patterns and update the QoS-parameter-TDD-pattern associations 310 based on the observations. The memory 304 can also store other modules and data 316. The other modules and data 316 can be utilized by the base station 106 to perform or enable performing any action taken by the base station 106, such as establishing radio connections. The other modules and data 316 can include a platform, operating system, firmware, and/or applications, and data utilized by the platform, operating system, firmware, and/or applications.

The transmission interfaces 306 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with the UE 104, other base stations or RAN elements, elements of the core network 108, and/or other network elements, and can transmit data over such connections. For example, the transmission interfaces 306 can establish a connection with the UE 104 over an air interface. The transmission interfaces 306 can also support transmissions using one or more radio access technologies, such as 5G NR. The transmission interfaces 306 can also be used by the base station 106 to send and receive messages, such as those described with respect to FIG. 2, and to perform operations, such as those described with respect to FIG. 4.

Example Operations

Figure 4:
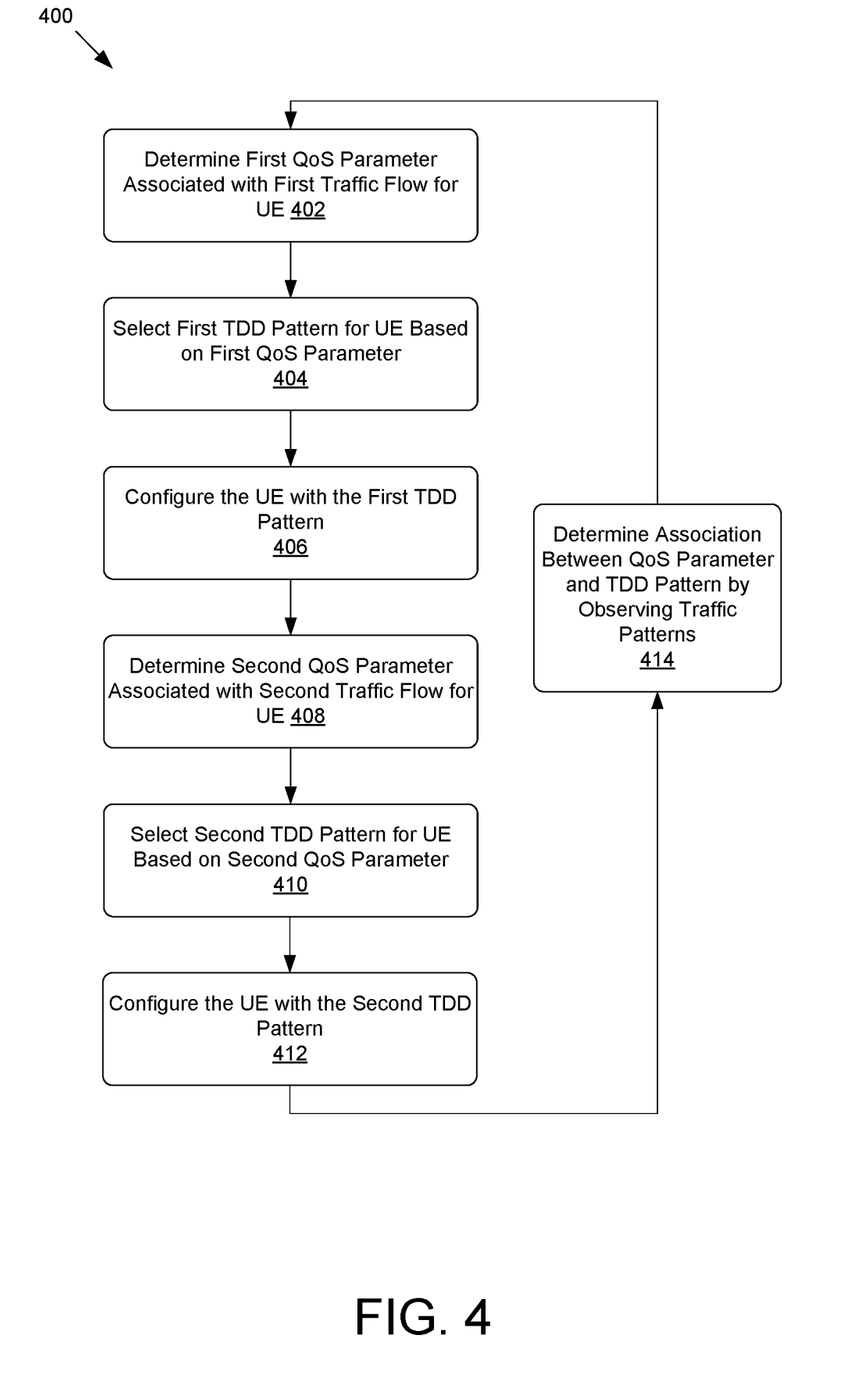
FIG. 4 shows a flowchart of an example method in which the base station can select TDD patterns for a UE based on QoS parameters associated with UE traffic flows.

FIG. 4 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 4 shows a flowchart of an example method in which the base station can select TDD patterns for a UE based on QoS parameters associated with UE traffic flows. At 402, the base station determines a first QoS parameter associated with a first traffic flow for UE. In some implementations, the first QoS parameter is one of an ARP, a QCI, or a 5QI. Also, the first QoS parameter may be a proxy for a service identifier, allowing the base station to make an inference as to the service represented by the first traffic flow.

In one implementation, the first traffic flow includes both a voice calling traffic flow and a data browsing traffic flow, and the base station is configured to prioritize a QoS parameter for the voice calling traffic flow or a QoS parameter for the data browsing traffic flow as the first QoS parameter for the first traffic flow.

At 404, the base station selects a first TDD pattern for the UE based on the first QoS parameter. In some implementations, the first TDD pattern may utilize a downlink-weighted TDD ratio when the first QoS parameter is associated with a video streaming service or a data browsing service. Alternatively, the first TDD pattern may utilize a TDD ratio equally weighted between downlink and uplink when the first QoS parameter is associated with a voice calling service, a video calling service, a messaging service or a video conferencing service, or may utilize an uplink-weighted TDD ratio when the first QoS parameter is associated with a security camera service.

At 406, the base station configures the UE with the first TDD pattern.

At 408, the base station determines a second QoS parameter associated with a second traffic flow for the UE. The second QoS parameter is different from the first QoS parameter, corresponding to a difference in services associated with the first traffic flow and second traffic flow. The different services may include any of a voice calling service, a video calling service, a messaging service, a video streaming service, a data browsing service, a video conferencing service, a security camera service, or an AR/VR service.

At 410, the base station selects a second TDD pattern for the UE based on the second QoS parameter. The second TDD pattern is different from the first TDD pattern because of the corresponding differences between the first QoS parameter and second QoS parameter.

At 412, the base station configures the UE with the second TDD pattern.

At 414, before, after, or while the operations of 402-412 are performed, the base station may determine an association between a QoS parameter and a TDD pattern by observing traffic patterns associated with the QoS parameter.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   determining, by a base station, a first quality-of-service (QOS) parameter associated with a first traffic flow for a user equipment (UE);
   selecting, by the base station, a first time division duplex (TDD) pattern for the UE based on the first QoS parameter;
   configuring, by the base station, the UE with the first TDD pattern; determining, by the base station, a second QoS parameter associated with a second traffic flow for the UE, the second QoS parameter being different from the first QoS parameter;
   selecting, by the base station, a second TDD pattern for the UE based on the second QoS parameter, the second TDD pattern being different from the first TDD pattern; and
   configuring, by the base station, the UE with the second TDD pattern,
   wherein the first traffic flow includes both a voice calling traffic flow and a data browsing traffic flow, and the base station is configured to prioritize a QoS parameter for the voice calling traffic flow or a QoS parameter for the data browsing traffic flow as the first QoS parameter for the first traffic flow when selecting the first TDD pattern.

2. The method of claim 1, wherein the first QoS parameter or the second QoS parameter is one of an allocation and retention priority (ARP), a QoS class identifier (QCI), or a Fifth Generation (5G) QoS identifier (5QI).

3. The method of claim 1, wherein the first traffic flow and the second traffic flow are associated with different services.

4. The method of claim 3, wherein the different services include any of a voice calling service, a video calling service, a messaging service, a video streaming service, a data browsing service, a video conferencing service, a security camera service, or an augmented reality/virtual reality (AR/VR) service.

5. The method of claim 4, wherein the first TDD pattern utilizes a downlink-weighted TDD ratio when the first QoS parameter is associated with a video streaming service or a data browsing service.

6. The method of claim 4, wherein the first TDD pattern utilizes a TDD ratio equally weighted between downlink and uplink when the first QoS parameter is associated with a voice calling service, a video calling service, a messaging service or a video conferencing service.

7. The method of claim 4, wherein the first TDD pattern utilizes an uplink-weighted TDD ratio when the first QoS parameter is associated with a security camera service.

8. The method of claim 3, wherein the first QoS parameter or the second QoS parameter is a proxy for a service identifier.

9. The method of claim 1, wherein the base station is configured to determine an association between a QoS parameter and a TDD pattern by observing traffic patterns associated with the QoS parameter.

10. A non-transitory storage medium having a plurality of programming instructions stored thereon, the programming instructions being configured to be executed by a base station to perform operations comprising:
 determining a quality-of-service (QOS) parameter associated with a traffic flow for a user equipment (UE);
 selecting a time division duplex (TDD) pattern for the UE based on the QoS parameter; and
 configuring the UE with the TDD pattern,
 wherein the traffic flow includes both a voice calling traffic flow and a data browsing traffic flow, and the base station is configured to prioritize one QoS parameter for the voice calling traffic flow or another QoS parameter for the data browsing traffic flow as the QoS parameter for the traffic flow when selecting the TDD pattern.

11. The non-transitory storage medium of claim 10, wherein the QoS parameter is a first QoS parameter, the traffic flow is a first traffic flow, the TDD pattern is a first TDD pattern, and the operations further include: determining a second QoS parameter associated with a second traffic flow for the UE, the second QoS parameter being different from the first QoS parameter; selecting a second TDD pattern for the UE based on the second QoS parameter, the second TDD pattern being different from the first TDD pattern; and configuring the UE with the second TDD pattern.

12. The non-transitory storage medium of claim 11, wherein the first traffic flow and the second traffic flow are associated with different services.

13. The non-transitory storage medium of claim 12, wherein the different services include any of a voice calling service, a video calling service, a messaging service, a video streaming service, a data browsing service, a video conferencing service, a security camera service, or an augmented reality/virtual reality (AR/VR) service.

14. A base station comprising:
 one or more processors; and programming instructions that, when executed by the one or more processors, case the base station to perform operations including:
 determining a quality-of-service (QOS) parameter associated with a traffic flow for a user equipment (UE);
 selecting a time division duplex (TDD) pattern for the UE based on the QoS parameter; and
 configuring the UE with the TDD pattern,
 wherein the traffic flow includes both a voice calling traffic flow and a data browsing traffic flow, and the base station is configured to prioritize one QoS parameter for the voice calling traffic flow or another QoS parameter for the data browsing traffic flow as the QoS parameter for the traffic flow when selecting the TDD pattern.

15. The base station of claim 14, wherein the QoS parameter is a first QoS parameter, the traffic flow is a first traffic flow, the TDD pattern is a first TDD pattern, and the operations further include:
 determining a second QoS parameter associated with a second traffic flow for the UE, the second QoS parameter being different from the first QoS parameter;
 selecting a second TDD pattern for the UE based on the second QoS parameter, the second TDD pattern being different from the first TDD pattern; and
 configuring the UE with the second TDD pattern.

16. The base station of claim 15, wherein the first QoS parameter or the second QoS parameter is one of an allocation and retention priority (ARP), a QoS class identifier (QCI), or a Fifth Generation (5G) QoS identifier (5QI).

17. The base station of claim 15, wherein the first traffic flow and the second traffic flow are associated with different services.

18. The base station of claim 17, wherein the different services include any of a voice calling service, a video calling service, a messaging service, a video streaming service, a data browsing service, a video conferencing service, a security camera service, or an augmented reality/virtual reality (AR/VR) service.

19. The base station of claim 18, wherein the first TDD pattern utilizes a downlink-weighted TDD ratio when the first QoS parameter is associated with a video streaming service or a data browsing service.

20. The base station of claim 18, wherein the first TDD pattern utilizes a TDD ratio equally weighted between downlink and uplink when the first QoS parameter is associated with a voice calling service, a video calling service, a messaging service or a video conferencing service.

* * * * *